(12) United States Patent
Pina López et al.

(10) Patent No.: US 8,584,986 B2
(45) Date of Patent: Nov. 19, 2013

(54) INNER BENT REPAIRMENT

(75) Inventors: José María Pina López, Alcorcón (ES); Enrique Vera Villares, Getafe (ES)

(73) Assignee: Airbus Operations, S.L., Madrid (ES)

( * ) Notice: Subject to any disclaimer, the term of this patent is extended or adjusted under 35 U.S.C. 154(b) by 128 days.

(21) Appl. No.: 13/282,963

(22) Filed: Oct. 27, 2011

(65) Prior Publication Data

US 2012/0104166 A1    May 3, 2012

(30) Foreign Application Priority Data

Oct. 29, 2010   (ES) .................................. 201031595

(51) Int. Cl.
*B64C 1/00* (2006.01)

(52) U.S. Cl.
USPC ....................................... 244/119; 29/402.18

(58) Field of Classification Search
USPC ..................... 244/119, 123.5, 123.6
See application file for complete search history.

(56) References Cited

U.S. PATENT DOCUMENTS

| | | | |
|---|---|---|---|
| 2,412,972 A | 12/1946 | Dean | |
| 3,443,776 A * | 5/1969 | Moore | 244/5 |
| 4,789,918 A * | 12/1988 | Bannink, Jr. | 361/218 |
| 4,858,853 A | 8/1989 | Westerman et al. | |
| 5,201,831 A * | 4/1993 | Higgins et al. | 244/119 |
| 7,237,751 B2 * | 7/2007 | Anning | 244/123.3 |
| 7,871,040 B2 * | 1/2011 | Lee et al. | 244/119 |
| 7,875,141 B2 * | 1/2011 | Bogue et al. | 156/98 |
| 2004/0118978 A1 * | 6/2004 | Anning | 244/123 |
| 2006/0277736 A1 * | 12/2006 | Staquet | 29/402.11 |
| 2007/0095982 A1 * | 5/2007 | Kismarton et al. | 244/119 |
| 2007/0145638 A9 * | 6/2007 | Mead | 264/272.15 |
| 2008/0111024 A1 * | 5/2008 | Lee et al. | 244/121 |
| 2011/0251036 A1 * | 10/2011 | Doetsch et al. | 492/48 |
| 2012/0211602 A1 * | 8/2012 | Dugerie et al. | 244/119 |

FOREIGN PATENT DOCUMENTS

GB       2 449 535 A       11/2008

OTHER PUBLICATIONS

Search Report issued Jan. 30, 2013 in Spanish Patent Application No. 201031595.

* cited by examiner

*Primary Examiner* — Christopher P Ellis
*Assistant Examiner* — Medhat Badawi
(74) *Attorney, Agent, or Firm* — Oblon, Spivak, McClelland, Maier & Neustadt, L.L.P.

(57) ABSTRACT

A method for repairing the skin of the fuselage of an airplane from the inside to be used when the skin of the fuselage has been damaged between a first stringer and a second stringer adjacent to the first one is provided. The method includes filling the damage, placing a first doubler over the filling, placing a second doubler over the first doubler and bending this second doubler at least over a flange of one of the stringers, and securing the second doubler.

10 Claims, 4 Drawing Sheets

INNER BENT REPAIRMENT

OBJECT OF THE INVENTION

The main object of the present invention is to provide a method of repairing the fuselage of an airplane which allows minimizing the width of the foot of the stringers used in the fuselage section of the airplane.

Another object of the present invention is to save weight in the structures of the airplanes.

A further object of the present invention is to provide a method of inner repair of an aircraft that is faster than the ones known from the prior art.

Another object of the invention is to provide a method of inner repair of an aircraft by using standard preforms of doubler parts.

BACKGROUND OF THE INVENTION

It is a requirement to take into account the maintainability and reparability of the structures and systems installations in the design of aeronautical fuselage.

These considerations cause that, on many occasions, structural elements have to be dimensioned larger than it would have been necessary without these requirements. That leads to an increase of weight.

The minimum width according to the repairing method to be used and according to future operations to be performed in a damaged structure has to be considered when dimensioning the width of the foot of the stringers. The most critical method of repair is the inner repair of damage in the skin of the fuselage of an airplane when the damage has been caused between two adjacent stringers.

Current methods of designing the stringers of the fuselage of an airplane select the width of the foot of the stringers making that width depend on a length equivalent to the distance from the riveting point to the edge of the foot of the stringer. This distance is determined by the design principles defined for this purpose.

The width of the foot of the stringer is also designed according to the radius of the foot, the tolerance of the radius of the foot, the thickness of the stringer, and the diameter of the rivet.

DESCRIPTION OF THE INVENTION

The present invention is designed to overcome above-mentioned drawbacks of over dimensioning the stringers when repair design principles and maintenance known in the state of the art, are considered for thereof design.

The present invention provides a method for repairing damage in the structure of an airplane from the inside of the airplane.

When designing the stringers to be used in the structure of the airplane, it is necessary to consider the concepts of reparability and maintainability. As a result, the width of the foot of the stringer designed is larger than the width of a stringer designed considering only the strengths and tensions which the stringer has to bear would have had.

The most critical case of repair of the fuselage of an airplane for the stringer foot width is the inner repair of the skin of the fuselage when said skin has been damaged between two adjacent stringers.

A most critical situation occurs when one of the stringers next to the damage in the skin is also damaged.

With the present invention a new method for inner repairs is provided. This method allows the use of a stringer with a foot smaller than the ones usually needed, consequently the weight of the stringers decreases, so hence the weight of the aircraft decreases.

The present invention provides a method for repairing the skin of the fuselage of an airplane from the inside when the skin of the fuselage has been damaged between a first stringer and a second stringer, adjacent to the first one, which comprises:

a first step of filling the damage with a filler, a second step of placing a first doubler over the filler, between the first stringer and the second stringer, a third step of placing a second doubler over the first doubler and bending at least one of the ends of said second doubler over a first flange of the first stringer, it being possible to bend the second double edge over a first flange of the second stringer, a fourth step of securing the second doubler.

In a first embodiment of the invention, when carrying out the fourth step of the method, said method comprises:

performing a first riveting between the damage and the first stringer to secure the second doubler to the skin and to the first doubler, performing a second riveting between the damage and the second stringer to secure the second doubler to the skin and to the first doubler, performing a third riveting to secure the second doubler to the skin and to the first stringer foot, and performing a fourth riveting to secure the second doubler to the skin and to the second stringer foot.

In a second embodiment of the invention, when carrying out the fourth step of the method, the four rivets of the first embodiment are performed too. In addition another riveting is done to secure the second doubler to the first flange of the first stringer. Consequently, in this second embodiment of the invention, when carrying out the fourth step of the method, said method also comprises:

performing a first riveting between the damage and the first stringer to secure the second doubler to the skin and to the first doubler, performing a second riveting between the damage and the second stringer to secure the second doubler to the skin and to the first doubler, performing a third riveting to secure the second doubler to the skin and to the first stringer foot, performing a fourth riveting to secure the second doubler to the skin and to the second stringer foot, and performing a fifth riveting to secure the second doubler to the first flange of the first stringer.

A third embodiment of the invention is provided for when one of the stringers adjacent to the skin damage is also damaged.

According to this third embodiment of the invention, before carrying out the fourth step, the method comprises placing a third doubler over the damaged stringer.

According to the third embodiment of the invention, the second doubler and the third doubler are placed over the damaged stringer overlapping the upper part of said stringer.

According to this third embodiment of the invention, when carrying out the fourth step of the method, said method comprises performing a first riveting between the damage and the first stringer to secure the second doubler to the skin and to the first doubler, performing a second riveting between the damage and the second stringer to secure the second doubler to the skin and to the first doubler, performing a third riveting to secure the second doubler to the skin and to the first stringer foot, performing a fourth riveting to secure the second doubler to the skin and to the second stringer foot, performing a fifth riveting to secure the second doubler to a first flange of the damaged stringer, performing a sixth riveting to secure the second doubler and the third doubler to the upper part of the damaged stringer, performing a seventh riveting to secure the third doubler to a second flange of the damaged stringer, and performing an eighth riveting to secure the third doubler to the second foot of the first stringer.

The method of the present invention can be used with stringers with a different cross-section shape such as "T", "I" etc. To use the method with stringers with a different cross-section shape, the doublers to be used are different and adaptable to the stringer used in each case.

The stringer used when carrying out the method described above in all its different embodiments is also an object of the present invention.

The stringer considered is designed only according to the strengths and tensions that it bears.

The width of the foot of the stringer object of the present invention is smaller than the width which a same stringer being designed considering the minimum width according to the methods currently used for repair design principles would have had.

The methods currently used consider the minimum width of the foot of the stringer linked to a length equivalent to the distance between the riveting point and the edge of the stringer foot and linked to the distance between the riveting point and the edge of the second doubler. These distances are equal.

Consequently, in stringers currently designed following the calculation criteria according to the repair design principles, the minimum width of the stringer foot is linked to a length equivalent to twice the distance between the riveting point and the stringer foot edge.

When considering the distance from the riveting point to the edge of the stringer foot or to the edge of the second doubler, that distance has to be enough to avoid the breaking of the components because of the tensions that they have to bear. These tensions are higher when the riveting is performed close to an edge.

The most important advantage of the present invention is that the bending of the second doubler over the stringer flange allows minimizing the length to which the width of the stringer foot is linked.

With the present method, the width of the foot of the stringer is linked to a length equivalent to the distance from the riveting point to the edge of the stringer foot and to the distance from the riveting point and to the radius of the stringer foot.

Since the edge of the second doubler is far enough from the riveting point, the tensions that the elements have to bear are lower. Consequently, the distance to consider in this case, which is the distance between the riveting point and the radius of the stringer foot, is smaller than the distance between the riveting point and the edge of the stringer foot.

This decrease of the width of the stringer foot is a great decrease in the weight of the aircraft, which is one of the aims of the present invention. This aim of reducing the weight of the aircraft is one of the main objects of the invention in that in the aeronautics industry, which is the industry in which the proposed method is used, the weight of the components is a key factor.

In a preferred embodiment of the invention it is not necessary to use rivets to secure the first and the second doublers to the skin and to the stringers. Instead of that, a line of adhesive is applied on the skin and the filler to secure the first doubler, and a line of adhesive is applied on the first doubler, on the first stringer foot, on the second stringer foot and at least on the first flange of the first stringer to secure the second doubler.

It is also possible to apply adhesive in the third embodiment. In this case the adhesive is applied between the elements mentioned above, and between the third doubler and the second flange of the first stringer.

In a preferred embodiment of the invention, it is possible to use both, the adhesive and the rivets, to secure the elements at the same time.

BRIEF DESCRIPTION OF THE DRAWINGS

The present invention will be entirely understood on the basis of the following detailed description of its embodiments and the accompanying drawings that are filed solely as an example and are therefore not restrictive of the scope of the present invention, and in which.

REFERENCES

Figure 1:
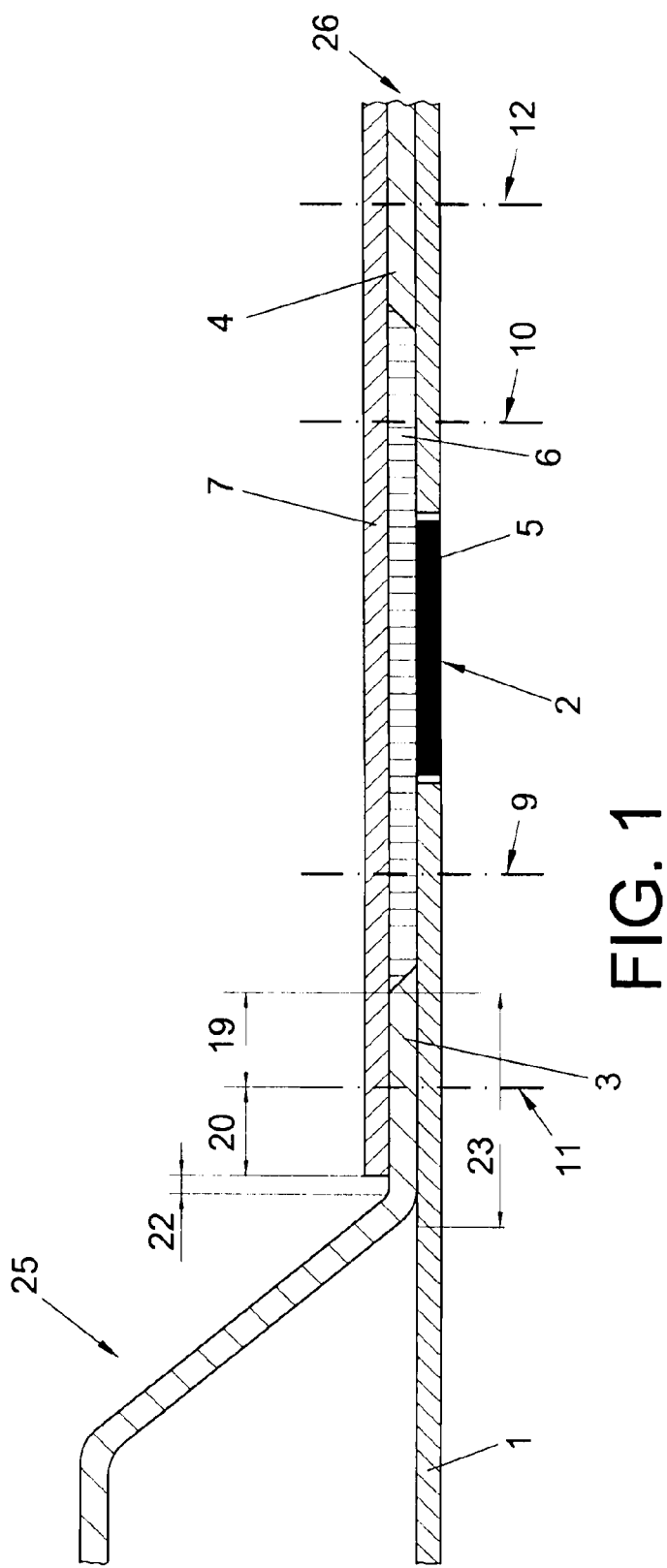
FIG. 1 depicts an inside repair which has been done following the methods known from the prior art.

1: skin of the airplane
2: damage on the skin
3: first stringer foot
4: second stringer foot
5: filler
6: first doubler
7: second doubler
8: third doubler
9: first riveting
10: second riveting
11: third riveting
12: fourth riveting
13: fifth riveting
14: sixth riveting
15: seventh riveting
16: first flange of the first stringer
17: upper part of the first stringer
18: second flange of the first stringer
19: distance from the riveting point to the first edge of the stringer foot
20: distance from the riveting point to the second doubler edge
21: distance from the riveting point to the radius of the first stringer foot
22: foot radius tolerance
23: width of a used stringer foot designed according to traditional design methods
24: width of a stringer foot designed according to the method of the present invention 25: first stringer
26: second stringer
27: first line of adhesive
28: second line of adhesive
29: third line of adhesive
30: eighth riveting
31: second foot of the first stringer

DESCRIPTION OF A PREFERRED EMBODIMENT

The following description is provided for the benefit of the reader only, and is not intended to limit in any way the invention as set by the claims.

The present invention provides a method for repairing the skin (1) of the fuselage of an airplane from the inside when the skin (1) of the fuselage has been damaged (2) between a first stringer (25) and a second stringer (26), adjacent to the first one, which comprises:
- a first step of filling the damage (2) with a filler (5),
- a second step of placing a first doubler (6) over the filler (5), between the first stringer (25) and the second stringer (26),
- a third step of placing a second doubler (7) over the first doubler (6) and at least bending one of the two ends of said second doubler (7) over a first flange (16) of the first stringer (25), it being possible to bend the second end of the second doubler (7) over a first flange of the second stringer (26),
- a fourth step of riveting the second doubler (7).

Figure 2:
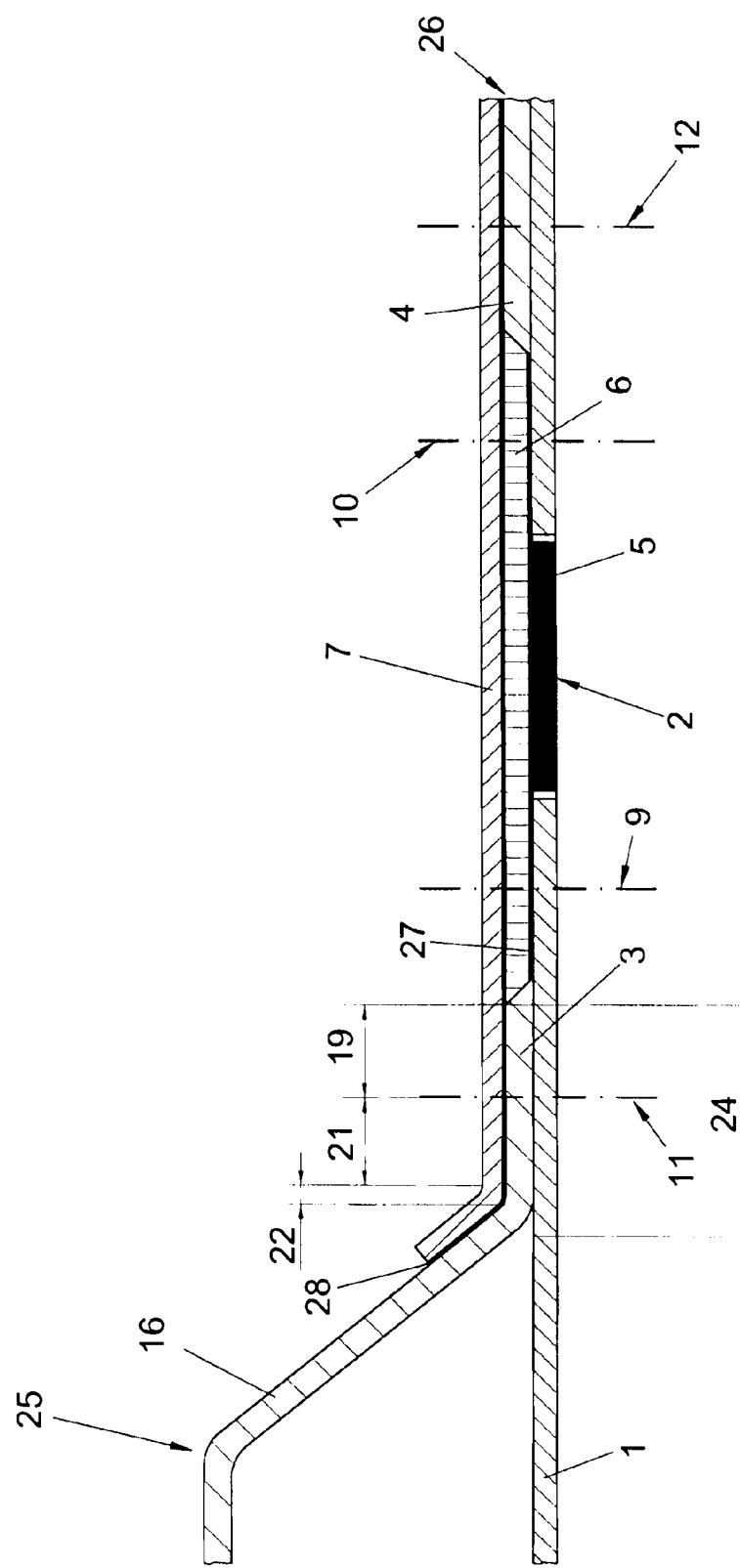
FIG. 2 depicts a first embodiment of the method of invention that comprises performing four rivets to secure the first doubler and the second doubler.

In a first embodiment of the invention, shown in FIG. 2, when carrying out the third step the method, such method comprises,
- performing a first riveting (9) between the damage (2) and the first stringer (25) to secure the second doubler (7) to the skin (1) and to the first doubler (6),
- performing a second riveting (10) between the damage (2) and the second stringer (26) to secure the second doubler (7) to the skin (1) and to the first doubler (6),
- performing a third riveting (11) to secure the second doubler (7) to the skin (1) and to the first stringer foot (3), and
- performing a fourth riveting (12) to secure the second doubler (7) to the skin (1) and to the second stringer foot (4).

Figure 3:
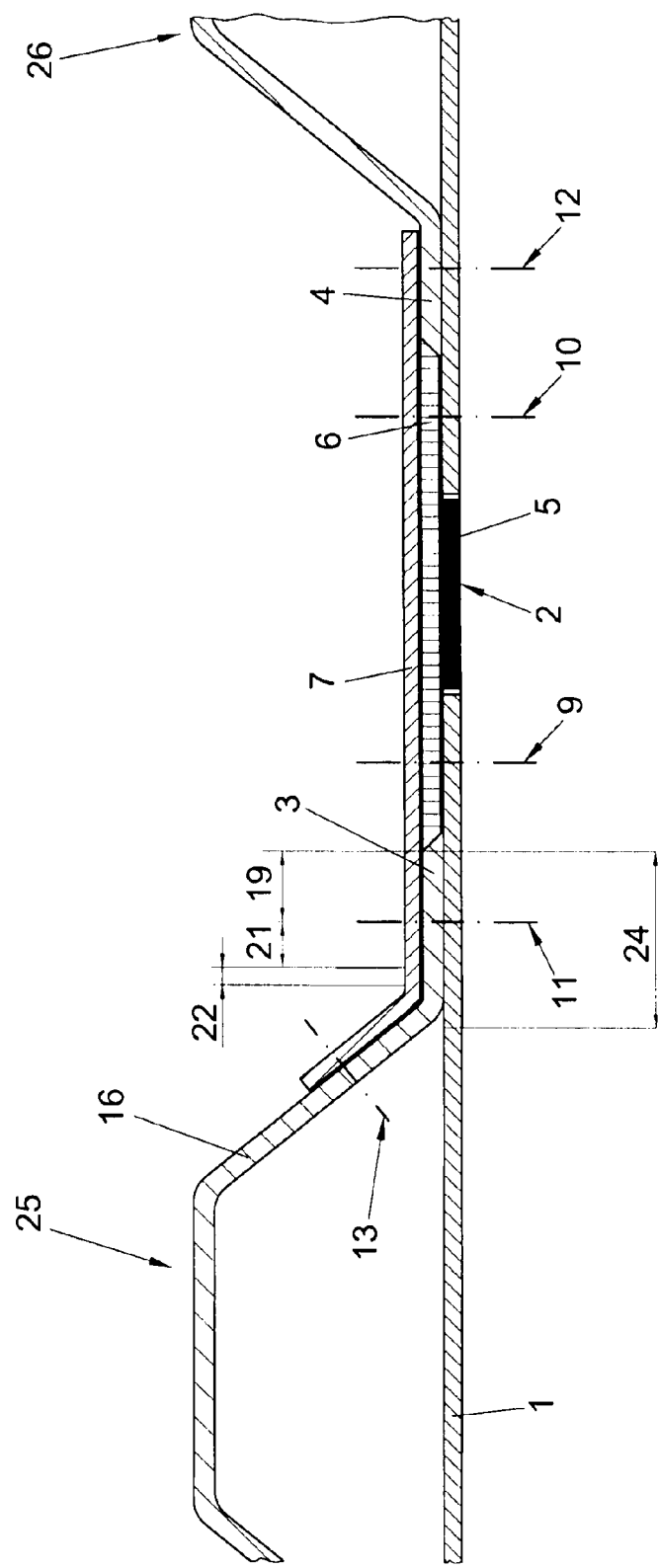
FIG. 3 shows a second embodiment of the method of invention that comprises performing the four rivets of the first embodiment and performing a fifth rivet to secure the second doubler to a flange of the first stringer.

In a second embodiment of the invention shown in FIG. 3, when carrying out the fourth step of the method, such method comprises:
- performing a first riveting (9) between the damage (2) and the first stringer (25) to secure the second doubler (7) to the skin (1) and to the first doubler (6),
- performing a second riveting (10) between the damage (2) and the second stringer (26) to secure the second doubler (7) to the skin (1) and to the first doubler (6),
- performing a third riveting (11) to secure the second doubler (7) to the skin (1) and to the first stringer foot (3),
- performing a fourth riveting (12) to secure the second doubler (7) to the skin (1) and to the second stringer foot (4), and
- performing a fifth riveting (13) to secure the second doubler (7) to the first flange of the first stringer (16).

Figure 4:
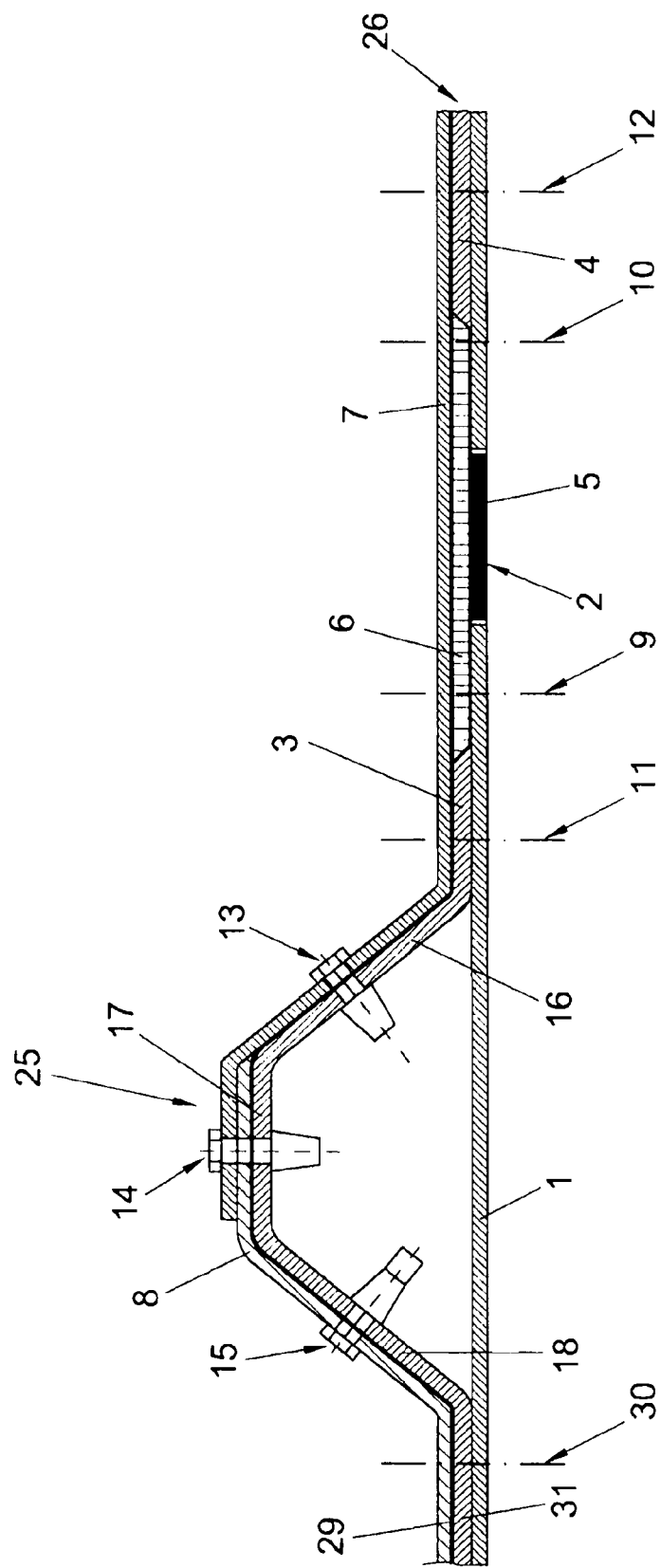
FIG. 4 shows a third embodiment of the method of invention when there is damage in a skin of the fuselage of an airplane and also in a stringer adjacent to the skin damage.

A third embodiment of the invention, shown in FIG. 4, is provided for when one of the stringers adjacent to the damage is also damaged.

According to the third embodiment of the invention, before carrying out the fourth step, the method comprises placing a third doubler (8) over the damaged stringer.

According to the third embodiment of the invention, the second doubler (7) and the third doubler (8) are placed over the damaged stringer overlapping the upper part (17) of said stringer.

This embodiment is explained hereinafter considering that the damaged stringer is the first stringer (25). However the method would also be applicable if the damaged stringer is the second stringer (26). The proposed method can be applied even if both stringers are damaged at the same time. Likewise, the claims and drawings refer to the first stringer (25), but the method is applicable if the second stringer (26) is the one that has been damaged. Similarly, the method is applicable when the two stringers (25, 26) adjacent to the skin damage have been damaged.

According to this third embodiment of the invention, when carrying out the fourth step of the method, said method comprises:
- performing a first riveting (9) between the damage (2) and the first stringer (25) to secure the second doubler (7) to the skin (1) and to the first doubler (6),
- performing a second riveting (10) between the damage (2) and the second stringer (26) to secure the second doubler (7) to the skin (1) and to the first doubler (6),
- performing a third riveting (11) to secure the second doubler (7) to the skin (1) and to the first stringer foot (3),
- performing a fourth riveting (12) to secure the second doubler (7) to the skin (1) and to the second stringer foot (4),
- performing a fifth riveting (13) to secure the second doubler (7) to a first flange (16) of the damaged stringer,
- performing a sixth riveting (14) to secure the second doubler (7) and the third doubler (8) to the upper part (17) of the damaged stringer,
- performing a seventh riveting (15) to secure the third doubler (8) to a second flange (18) of the damaged stringer, and
- performing an eighth riveting (30) to secure the third doubler (8) to the second foot of the damaged stringer (31).

The method of the present invention can be used with stringers with different cross-section shapes such as "T", "I" etc. To use the method with stringers with different type of stringers, the doublers to use are different and adaptable to the stringer used in each case.

It is also an object of the present invention the stringer used when carrying out the method above described in all its different embodiments.

The present invention provides also a stringer to be used in the present method. The stringer provided is designed considering only the strengths and tensions that the stringer has to bear.

The stringer object of the invention has a foot smaller than the one a same stringer being designed considering the minimum width for the foot of the stringers according to repair design principles would have needed.

The following explanation of the saving in the stringer foot width is based on the measurements of the first stringer, but it is applicable to the second stringer or to any other kind of stringer.

FIG. 1 is a representation of a typical inner repair with rivets where the minimum width of the foot of the stringer (23) is linked to a length equivalent to the distance between the riveting point and the end of the stringer foot. Said distance is the same as the distance from the riveting point to the first stringer foot edge (19). That distance is also the same as the distance from the riveting point to the second doubler edge (20).

Consequently, in stringers currently designed following the repair design principles, the minimum width of the stringer foot (23) is linked to a length equivalent to twice the distance from the riveting point to the stringer foot edge.

When considering the distance from the riveting point to the edge of the stringer foot or to the edge of the second doubler, that distance has to be long enough to avoid the breaking of the components because of the tensions that they have to bear. Those tensions are higher when the riveting is made close to an edge.

The width of the stringer foot is also linked to the foot radius tolerance (22), to the foot radius and to the stringer thickness.

The most important advantage of the present invention is that the bending of the second doubler (7) over a stringer flange allows minimizing the length to which the width of the stringer foot is linked.

With the present method, the width of the foot of the stringer (24) is linked to a length equivalent to the distance from the riveting point to the edge of the stringer (19) and the distance from the riveting point to the radius of the stringer foot (21).

Since the second edge of the second doubler is far enough from the riveting point, the tensions that the elements have to bear are lower. Consequently, the distance to be considered in this case from the riveting point to the radius of the first stringer foot (21) is smaller than the distance from the riveting point to the second doubler edge (20).

The invention claimed is:

1. A method for repairing a skin of a fuselage of an airplane from an inside of the airplane when the skin of the fuselage has a damage between a first stringer and a second stringer, adjacent to the first stringer, said method comprising:
    filling the damage with a filler,
    placing a first doubler between the first stringer and the second stringer,
    placing a second doubler over the first doubler and at least bending one of the two ends of said second doubler over a first flange of the first stringer, and
    securing the second doubler.

2. The method according to claim 1, wherein when carrying out said securing of the second doubler, said method comprises:
    performing a first riveting between the damage and the first stringer to secure the second doubler to the skin and to the first doubler,
    performing a second riveting between the damage and the second stringer to secure the second doubler to the skin and to the first doubler,
    performing a third riveting to secure the second doubler to the skin and to a first stringer foot, and
    performing a fourth riveting to secure the second doubler to the skin and to a second stringer foot.

3. The method according to claim 2, wherein when carrying out said securing of the second doubler, said method comprises:
    performing a fifth riveting to secure the second doubler to the first flange of the first stringer.

4. The method according to claim 1, wherein one of the first stringer or the second stringer is a damaged stringer and before carrying out said placing of the second doubler, the method comprises placing a third doubler over the damaged stringer overlapping with the second doubler over the third doubler at an upper part of the damaged stringer.

5. The method according to claim 4, wherein when carrying out said securing of the second doubler, said method comprises:
    performing a first riveting between the damage and the first stringer to secure the second doubler to the skin and to the first doubler,
    performing a second riveting between the damage and the second stringer to secure the second doubler to the skin and to the first doubler,
    performing a third riveting to secure the second doubler to the skin and to a first stringer foot,
    performing a fourth riveting to secure the second doubler to the skin and to a second stringer foot,
    performing a fifth riveting to secure the second doubler to a first flange of the damaged stringer,
    performing a sixth riveting to secure the second doubler and the third doubler to the upper part of the damaged stringer,
    performing a seventh riveting to secure the third doubler to a second flange of the damaged stringer, and
    performing an eighth riveting to secure the third doubler to the second foot of the damaged first stringer.

6. The method according to claim 1, wherein before carrying out said placing of the second doubler, said method comprises applying a first line of adhesive on the filler and on the skin to secure the first doubler to the filler and to the skin.

7. The method according to claim 1, when carrying out said securing of the second doubler, the method comprises applying a second line of adhesive between the second doubler and the first doubler, a first stringer foot, a second stringer foot and the first flange of the first stringer to secure the second doubler.

8. The method according to claim 4, wherein when carrying out said securing of the second doubler, a third line of adhesive is applied between the third doubler and a second flange of the first stringer and between the third doubler and a second foot of the first flange.

9. The method according to claim 1, wherein said at least bending one of the two ends of said second doubler over the first flange of the first stringer, comprises bending the second end of the second doubler over the first flange of the second stringer.

10. The method according to claim 1, wherein said at least bending one of the two ends of said second doubler over the first flange of the first stringer, comprises bending the first and second ends of the second doubler.

\* \* \* \* \*